United States Patent [19]

Klarer

[11] Patent Number: 5,154,686
[45] Date of Patent: Oct. 13, 1992

[54] TOOL HOLDER WITH PROTECTIVE HOOD

[75] Inventor: Christoph Klarer, Berstrabe 4a,, Taufkirchen, D-8028, Fed. Rep. of Germany

[73] Assignee: Christoph Klarer, Taufkirchen, Fed. Rep. of Germany

[21] Appl. No.: 499,396

[22] PCT Filed: Dec. 16, 1988

[86] PCT No.: PCT/EP88/01169
§ 371 Date: Jul. 24, 1990
§ 102(e) Date: Jul. 24, 1990

[87] PCT Pub. No.: WO89/05708
PCT Pub. Date: Jun. 29, 1989

[30] Foreign Application Priority Data

Dec. 18, 1987 [DE] Fed. Rep. of Germany ... 8716734[U]

[51] Int. Cl.⁵ .............................................. B23Q 13/00
[52] U.S. Cl. .......................................... 483/59; 483/3; 211/1.51
[58] Field of Search ............................. 29/568; 211/1.5; 248/345.1; 279/1 TS, 89, 79, 1 ME

[56] References Cited

U.S. PATENT DOCUMENTS

| 3,715,801 | 2/1973 | Sato et al. | 29/568 |
| 3,844,028 | 10/1974 | Hague et al. | 29/568 |
| 4,069,918 | 1/1978 | Inoue et al. | 211/1.5 |
| 4,182,021 | 1/1980 | Kato et al. | 29/568 |
| 4,196,506 | 4/1980 | Reed | 29/568 |
| 4,312,111 | 1/1982 | Peiser et al. | 29/568 |
| 4,509,649 | 4/1985 | Evans | 211/70.6 |

FOREIGN PATENT DOCUMENTS 1110561 8/1984 U.S.S.R.
1574157 9/1980 United Kingdom.

Primary Examiner—Z. R. Bilinsky
Assistant Examiner—Julie R. Daulton
Attorney, Agent, or Firm—Banner, Birch, McKie & Beckett

[57] ABSTRACT

A protective hood for a tool holder with a conical part and a draw-in member connected thereto is disclosed, wherein the protective hood has a cover piece, which is adapted to the conical part and envelops this conical part so as to be soil-proof, and a flexible clamping device, which locks detachably the draw-in member.

7 Claims, 3 Drawing Sheets

TOOL HOLDER WITH PROTECTIVE HOOD

BACKGROUND OF THE INVENTION

The present invention relates to a tool holder with a protective hood with a conical part and a draw-in member connected thereto, wherein the protective hood has a cover piece, which is adapted to the conical part and envelops this conical part so as to be soil-proof, and a flexible clamping device, which locks detachably the draw-in member, wherein the draw-in member has a notch, and the flexible clamping device has a stop tab, which engages with the notch by means of a projection formed on the flexible end.

Such tool holders serve as chucks for different cutting tools such as drill, milling machine, grinding attachments, etc. The tool holder itself is clamped into a machine tool and driven by this machine tool. Such a tool holder has generally a conical part, which is received by a corresponding cone-shaped fitting shape of the machine tool. To clamp into the machine tool, the tool holder is provided with a notch in the bottom part and a draw-in cone, which is fastened above the conical apex and which also has a notch.

Handling the tool holder requires that the sensitive tapered face be handled with care. If this tapered face becomes dirty, for example, due to the coolant of the cutting tool or the fine metal chips generated during cutting and the tool holder is inserted in this state into the machine tool, deposits and indentations form along the tapered face of the tool holder and machine tool. The penetration of the coolant can also cause corrosion.

The result is that the seat of the tool holder is no longer precisely defined but rather receives a slight play so that the cutting tools can no longer be accurately guided.

It is known to insert the tool holder, turned by 180° when changing, into a receiving box. Such a storage results in the coolant located at the tool running downwards on the tapered face and soiling it. On the other hand, manual manipulation of the tool holder in the reverse position is dangerous because a user can readily slip when grasping the holder and be injured on a sharp cutting tool.

In the U.S. Pat. No. 4,196,506 an automatic tool changer is described in which the tool holder having a conical part and a draw-in member is received in the protective hood during its storage and transport. At the same time at the upper part a horizontally pivotable pawl is provided with a stop, whose shoulder can be made to engage with a flange of the tool holder, the pawl being under spring prestress.

In a tool store according to U.S. Pat. No. 4,182,021 a tool holder is held detachably in a protective hood; to this end, two clamps that are under spring pressure and provided at the protective hood grasp a tapered shaft segment of the tool holder.

SUMMARY OF THE INVENTION

Therefore, the object of the present invention is to provide a device, which permits a simple and reliable manipulation of the tool holder, the tapered face being protected during handling.

This problem is solved by the invention with a tool holder with a protective hood, as claimed in claim 1.

The notch of the draw-in member forms, when engaged with the projection of the stop tab, a point of rotation around which the tool holder can be swiveled. During this swivelling movement, the conical part pushes via the pressure region the stop tab outwardly so that the notch of the draw-in member is released.

The tool holder has preferably a draw-in member, which has a notch or recess, in which a stop tab with projection provided in the protective hood engages, in order to lock the tool holder. Thus, it is possible to introduce the tool holder in any rotary position.

Furthermore, it is preferred that the center section of the stop tab have a pressure region or pressure head, which makes contact with the introduced tool holder. The pressure region serves to unlock the stop tab. Preferably the protective hood is designed in such a manner that the introduced tool holder has a degree of freedom of movement. The notch of the draw-in member forms, when engaged with the projection of the stop tab, a point of rotation around which the tool holder can be swiveled. During this swivelling movement, the conical part pushes via the pressure region the stop tab outwardly so that the notch of the draw-in member is released. When the tool holder is introduced, a chamfering at the bottom of the projection serves to actuate the stop tab so that it slides via the draw-in member into the notch without any difficulty. The swivelling movement takes place preferably in the direction of the stop tab.

Preferably a fastening slot, with which the protective hood can be fastened to an arbitrary plate, is provided in the upper region of the cover piece of the protective hood. In this manner the protective hood can be fastened to holding plates, in particular to a rotary plate. The protective hood can be made of thermoplastic, an injected aluminum part being provided in the region of the fastening slot for reinforcement so that the protective hood cannot give way there. However, the protective hood can also be made of duroplastic, the flexible stop tabs being made of thermoplastic.

Preferably the cover piece is provided with longitudinally extending ribs, which guide the tapered face of the tool holder.

BRIEF DESCRIPTION OF THE DRAWINGS

The following description of three embodiments in connection with the drawings yield other advantages, features and possible applications of the present invention.

DETAILED DESCRIPTION

The figures show a tool holder 1, which has a conical part 2 and a draw-in cone 3 fastened to the end that is tapered to a point. Draw-in cone 3 has a notch or an annular T-slot 4. Various draw-in cones can be fastened in the conical part.

Figure 1:
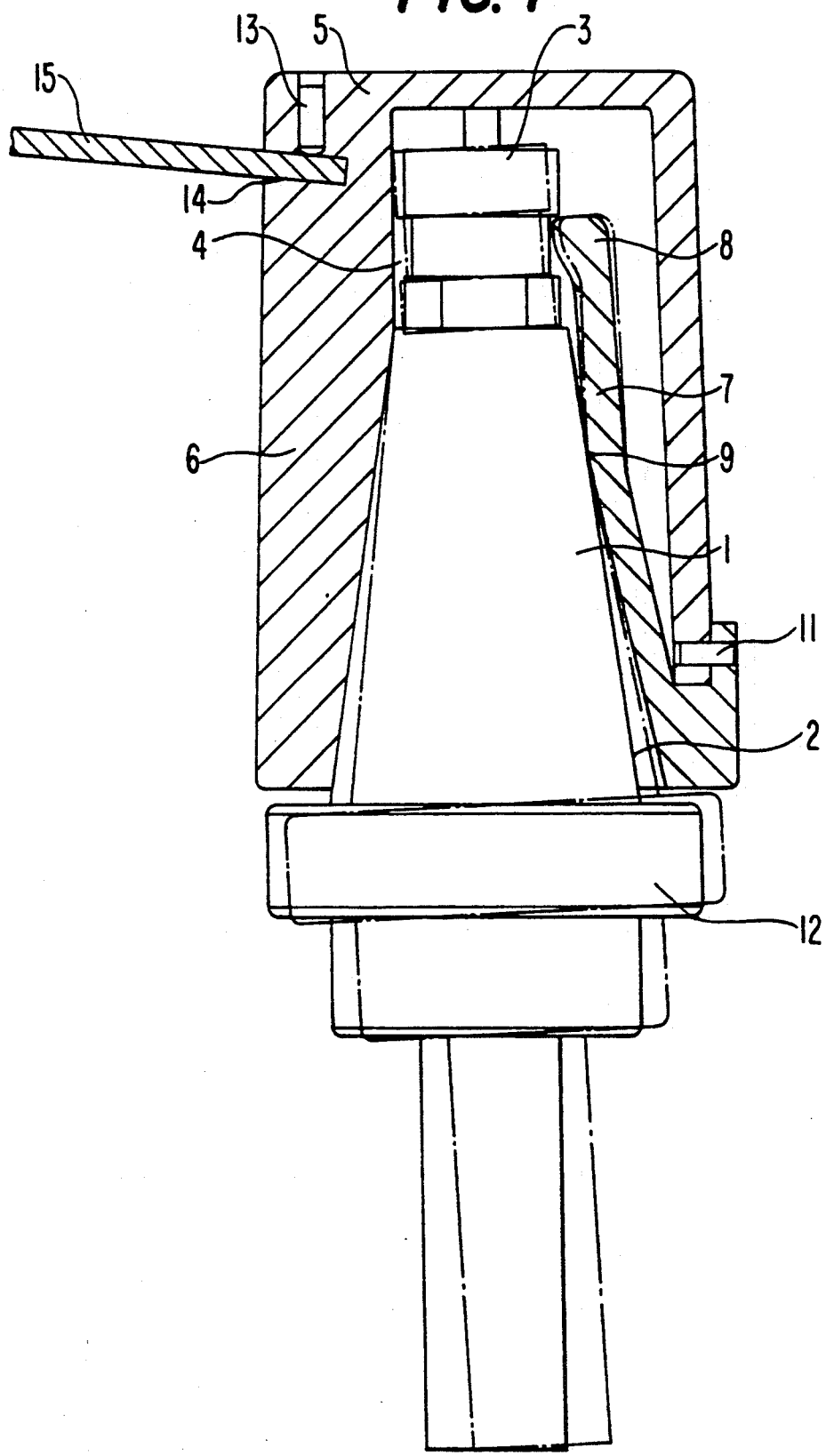
FIG. 1 is a cross-sectional view from the side of an embodiment of the invention.

FIG. 1 shows a first embodiment. Protective hood 5 has a cover piece 6 for the conical part 2 to be protected. Cover piece 6 has substantially the shape of a hollow cone, the cover surface enveloping the conical part semi-circularly in the cross-section. Stop tab 7, which touches the tapered face 2 only with a pressure region 9, is formed on the open side. The result is a freedom of movement on this side, which is utilized to unlock the tool holder. Stop tab 7 is inserted detachably into the protective hood 5 by means of a locking pin 11. However, the stop tab can also be designed as one piece in cover piece 6. A detachable connection makes it possible to use different stop tabs for the various draw-in cones 3. Stop tab 7 has a suitable projection 8, which engages in such a manner with the notch that the tool holder cannot move downward. The projection is chamfered on its bottom part.

A fastening slot 14 in which a holding plate 15 can be inserted movably is formed on the upper end of the protective hood. A pin 13, which fastens the holding plate 15 to protective hood 5 by means of a correspondingly formed recess, serves as a fastener. Instead of pin 13, however, a locking screw can also be used. The fastening can also constitute a U-shaped extension with which a holding plate engages.

A tool holder 1 is introduced into the protective hood from the bottom in the vertical direction. During this movement the face of draw-in cone 3 and projection 8 meet head-on and stop tab 7 slides out of its resting position outwardly so that the doughnut-shaped guide member of draw-in cone 3 can push via projection 8 of the stop tab and projection 8 locks into notch 4. The tool holder is unlocked in that the user swivels the tool holder in the direction of stop tab 7 so that the tool holder is unlocked via actuation of the pressure region 9 and can be removed from below. The dashed line in FIG. 1 shows the unlocked position.

Figure 2:
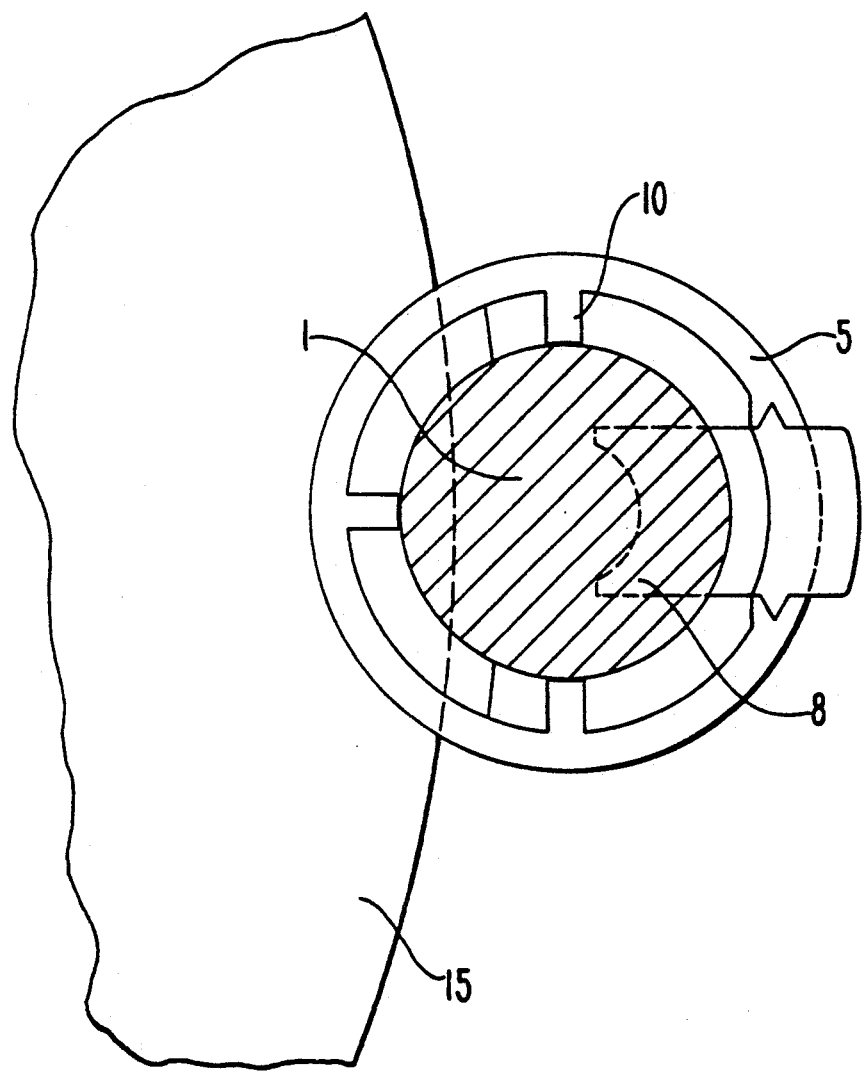
FIG. 2 is a cross-sectional view from the bottom of a second embodiment.

FIG. 2 is a cross-sectional view from below of another embodiment. In contrast to the embodiment of FIG. 1, cover piece 6 has longitudinally extending ribs 10, which are sloped relative to the longitudinal axis of the protective hood. At least three ribs that guide the conical part 2 are necessary. Projection 8 has a semi-circular recess, which meshes with as large a supporting surface as possible with notch 4 of draw-in cone 3. The fastening slot of the protective hood extends almost over the entire diameter of the protective hood and is well supported by the holding plate.

Figure 3:
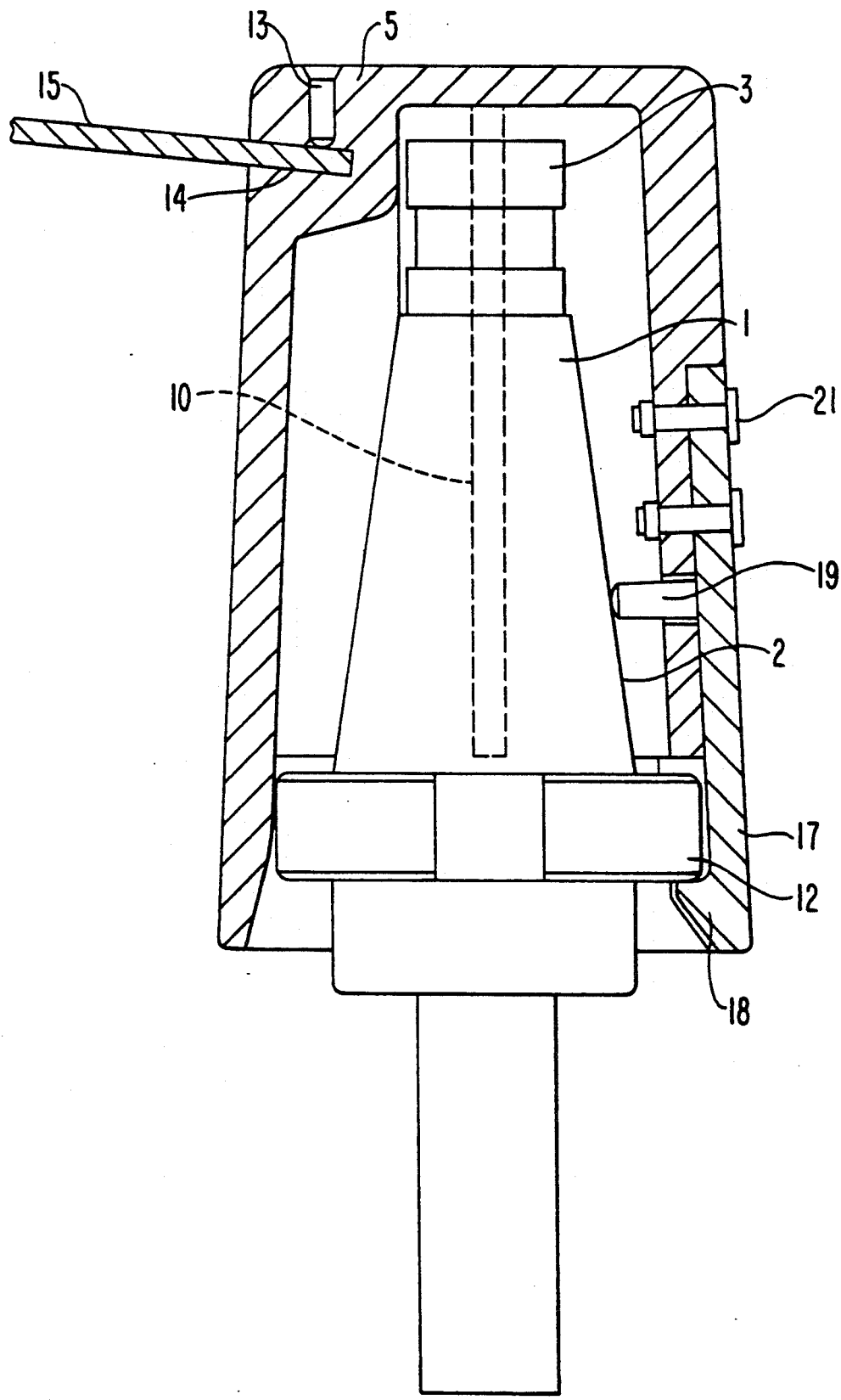
FIG. 3 is a cross-sectional side view of a third embodiment.

FIG. 3 shows another embodiment of the invention in which a torus 12 serves as the draw-in member of the tool holder. Torus 12 is provided below conical part 2. A stop tab 17, which is fastened with rivets 21 to a protective hood 5, serves to lock the draw-in member. However, the stop tab can also be integrated into the protective hood as one piece. In contrast to the embodiment of FIG. 1, stop tab 17 is clamped here in the upper part of the protective hood and carries out the planned clamping movement with a projection 18 in the bottom region of the protective hood. A pressure region 19 is also provided to actuate stop tab 17. The advantage of this embodiment lies in the fact that the stop tab does not need to be interchanged if different draw-in cones are attached to the tool holder. Torus 12 serving as the draw-in member is connected as one piece to the tool holder. In this embodiment, too, ribs 10, which guide the conical part, are also provided. At least three ribs are necessary.

I claim:

1. A protective hood for a tool holder, the tool holder having a conical portion and a draw-in portion adjacent thereto, the draw-in portion defining a notch therein, the protective hood defining a longitudinal axis and having a cover piece which is adapted to receive and envelop the conical portion of the tool holder to prevent soiling of the conical portion, and a flexible clamping device which detachably engages the notch of the draw-in portion to releasably retain the tool holder within the protective hood, characterized: in that said flexible clamping device includes a stop tongue provided with a projection at a free end thereof for releasably engaging the notch; in that the stop tongue extends in general parallel to the longitudinal axis of the protective hood; in that the stop tongue has a pressure region for releasing said projection from the notch to release the tool holder from said protective hood, said pressure region being longitudinally spaced from said projection and contacting the conical portion of the tool holder; and in that the tool holder is pivotably movable in said protective hood relative to said cover piece in the direction toward the stop tongue, such that said pivoting movement of the conical portion of the tool holder pushes the pressure region of the stop tongue outwardly so that the projection of the stop tongue releases the notch of the draw-in portion.

2. A protective hood according to claim 1, characterized in that the cover piece has in an upper region thereof a fastening slot with which the protective hood can be fastened to a holding plate.

3. A protective hood according to claim 1, characterized in that the protective hood is made of thermoplastic and the region of the fastening slot is reinforced by means of an injected aluminum part.

4. A protective hood according to claim 1, characterized in that the stop tongue is made of thermoplastic and the cover piece is made of duroplastic.

5. A protective hood according to claim 1, characterized in that the projection of the stop tongue has a semicircular recess which corresponds to the contour of the notch.

6. A protective hood according to claim 1, characterized in that the stop tongue and the hood are formed as a one piece element.

7. A protective hood according to claim 1, characterized in that the cover piece includes ribs which guide the conical part of the tool holder into said cover piece of the protective hood.

* * * * *